United States Patent
Becker et al.

(10) Patent No.: US 6,192,341 B1
(45) Date of Patent: *Feb. 20, 2001

(54) DATA PROCESSING SYSTEM AND METHOD FOR CUSTOMIZING DATA PROCESSING SYSTEM OUTPUT FOR SENSE-IMPAIRED USERS

(75) Inventors: Craig Henry Becker, Austin, TX (US); David Wayne Glass, Georgetown, KY (US); James Gordon McLean, Fuquay-Varina, NC (US); Clifford Alan Pickover, Yorktown Heights, NY (US); Daniel James Winarski, Tucson, AZ (US); Tin-Lup Wong, Chapel Hill, NC (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/056,116

(22) Filed: Apr. 6, 1998

(51) Int. Cl.[7] .................................................. C06F 17/00
(52) U.S. Cl. .......................... 704/271; 704/270; 345/471
(58) Field of Search .................................. 706/11; 345/33, 345/471, 145, 326, 475; 707/501, 513; 434/156, 185, 116; 704/275, 270, 271, 504, 225, 226

(56) References Cited

U.S. PATENT DOCUMENTS

| | | | |
|---|---|---|---|
| 5,151,998 | 9/1992 | Capps | 704/278 |
| 5,274,711 | 12/1993 | Rutledge et al. | 704/225 |
| 5,542,039 | 7/1996 | Brinson et al. | 345/326 |
| 5,692,906 | * 12/1997 | Corder | 434/156 |
| 5,771,048 | * 6/1998 | Nankou et al. | 345/471 |
| 5,799,292 | * 8/1998 | Hekmatpour | 706/11 |
| 5,870,709 | * 2/1999 | Bernstein | 704/275 |
| 5,929,841 | * 7/1999 | Fujii | 345/145 |
| 6,019,607 | * 2/2000 | Jenkins et al. | 434/116 |

* cited by examiner

Primary Examiner—John A. Follansbee
Assistant Examiner—Walter Benson
(74) Attorney, Agent, or Firm—Robert M. Sullivan; Felsman, Bradley, Vaden, Gunter & Dillon, LLP (57) ABSTRACT

A data processing system and method for customizing a user output of a data processing system are disclosed. According to the method, a user preference for an audio or visual user output of a data processing system is determined. In response to determination of a user output having a first audio or visual frequency, the user output is mapped to a second audio or visual frequency in accordance with the user preference to obtain a customized user output. Thereafter, the customized user output is presented by the data processing system. In accordance with one embodiment, the user preference is determined by administering a test of the user's visual or aural acuity.

32 Claims, 5 Drawing Sheets

DATA PROCESSING SYSTEM AND METHOD FOR CUSTOMIZING DATA PROCESSING SYSTEM OUTPUT FOR SENSE-IMPAIRED USERS

BACKGROUND OF THE INVENTION

1. Technical Field

The present invention relates in general to a method and system for data processing and in particular to a method and system for customizing the output of a data processing system. Still more particularly, the present invention relates to a method and system for customizing the output of a data processing system to meet the needs of a visually or aurally-impaired user.

2. Description of the Related Art

The permeation of industrialized nations by computer technology has dramatically expanded the opportunities afforded individuals with physical impairments. For example, through the use of computers, sometimes in conjunction with specialized input devices, speech impairments no longer inhibit the free flow of interpersonal communication. In addition, individuals with physical impairments that curtail physical labor can succeed economically by exploiting the growing demand for computer programmers, operators, designers, and other technical personnel.

The use of computers to facilitate the communication and economic opportunities of individuals with physical impairments has created a market for specialized computer input devices, such as mouth-pieces and modified keypads, that accommodate the needs of impaired individuals. Because consumers of such input devices form a statistically small, specialized market, the specialized input devices tend to be fairly expensive as compared to conventional computer peripheral devices.

Thus, two computer equipment markets have developed—a first that targets individuals with physical impairments that would otherwise inhibit use of computer systems and a second that targets individuals without physical impairments. The present invention includes a recognition that it would be desirable to develop computer systems that can assist individuals with nominal to moderate physical impairments who are to some extent capable, even with difficulty, of utilizing conventional computer systems.

SUMMARY OF THE INVENTION

It is therefore one object of the present invention to provide a method and system for data processing.

It is another object of the present invention to provide a method and system for customizing the output of a data processing system.

It is yet another object of the present invention to provide a method and system for customizing the output of a data processing system to meet the needs of a visually or aurally-impaired user.

The foregoing objects are achieved as is now described. According to the method of the present invention, a user preference for an audio or visual user output of a data processing system is determined. Next, in response to determination of a user output having a first audio or visual frequency, the user output is mapped to a second audio or visual frequency in accordance with the user preference to obtain a customized user output. Thereafter, the customized user output is presented to the user by the data processing system. In one embodiment, the user preference is determined in response to administration of a test of the user's visual or aural acuity.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
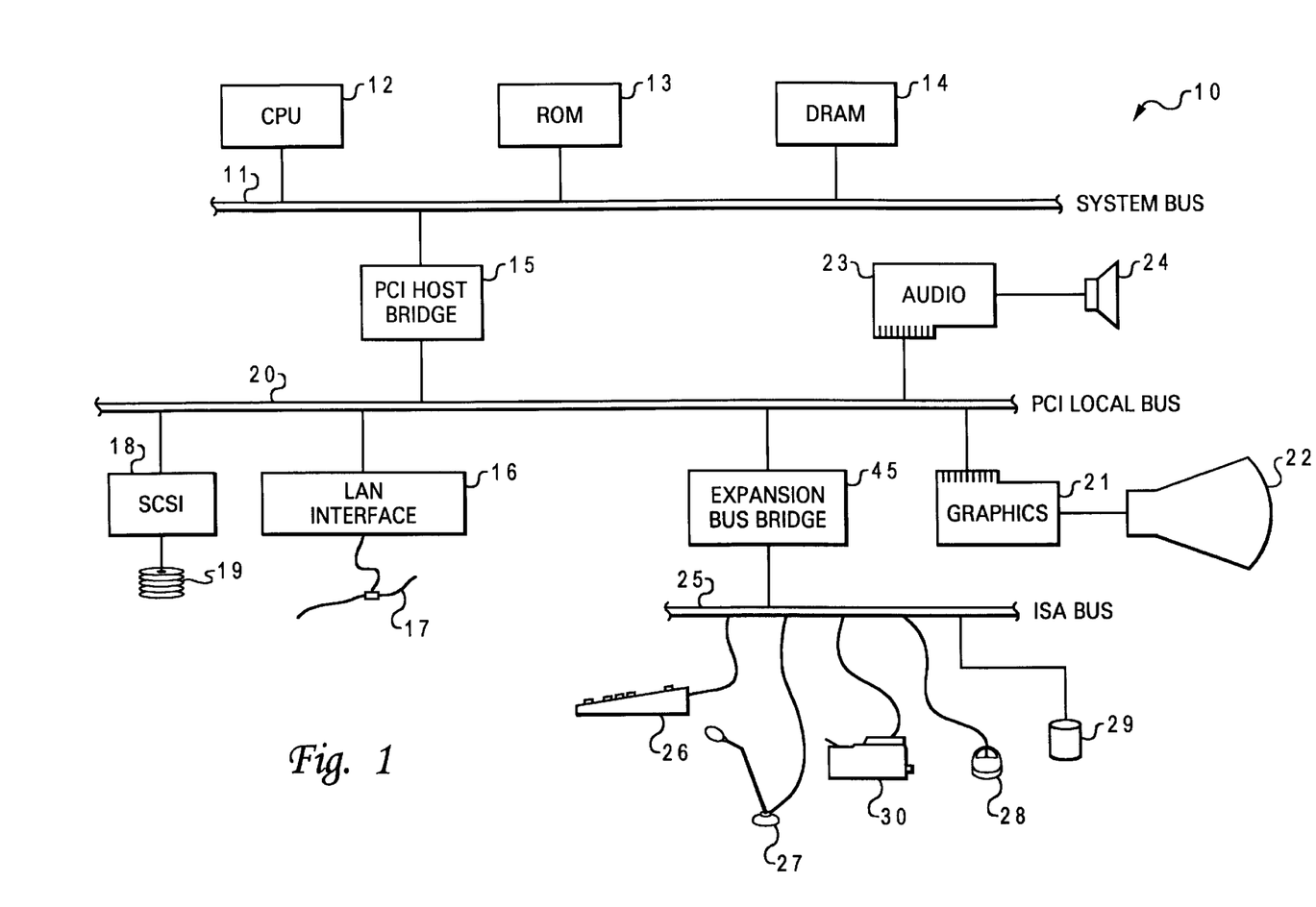
FIG. 1 is a block diagram of an illustrative embodiment of a data processing system with which the present invention may advantageously be utilized.

With reference now to the figures and in particular with reference to FIG. 1, there is depicted an illustrative embodiment of a data processing system with which the present invention may advantageously be utilized. As illustrated, data processing 10, which may comprise a personal computer system, includes a central processing unit (CPU) 12, a read only memory (ROM) 13, and a dynamic random access memory (DRAM) 14, which are each connected to system bus 11. ROM 13 stores boot code, which is executed by CPU 12 at power on. Following power on, CPU 12 typically executes operating system and application software stored within DRAM 14.

System bus 11 is coupled to peripheral component interconnect (PCI) local bus 20 via PCI host bridge 15. PCI host bridge 15 provides a low latency through which CPU 12 can directly access PCI devices mapped within bus memory or I/O address space. In addition, PCI host bridge 15 provides a high bandwidth path through which PCI devices can directly access DRAM 14. The PCI devices attached to PCI local bus 20 include a small computer system interface (SCSI) 18 that controls SCSI disk drive 19, a local area network (LAN) interface 16 that controls access to LAN 17, an audio adapter 23 that drives speaker(s) 24, and a graphics adapter 21 that controls display 22.

PCI local bus 20 is further coupled to industry standard architecture (ISA) bus 25 via expansion bus bridge 45. As shown, ISA bus 25 supports communication with a number of peripheral devices, including keyboard 26, microphone 27, mouse 28, integrated device electronics (IDE) hard disk 29, and printer 30. As will be understood by those skilled in the art, SCSI disk drive 19 and IDE hard disk 29 provide non-volatile storage for instructions and data that may be accessed and processed by CPU 12.

Figure 2:
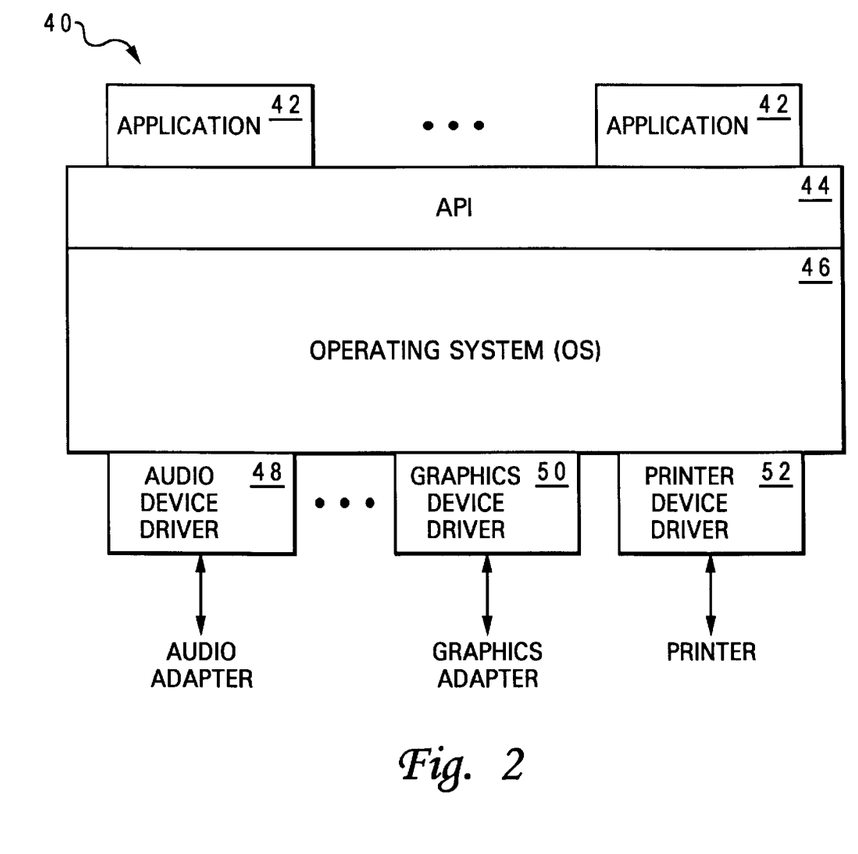
FIG. 2 is a high level block diagram of the software configuration of the data processing system depicted in FIG. 1.

Referring now to FIG. 2, there is depicted a layer diagram of an exemplary software configuration of data processing system 10. As illustrated, software configuration 40 includes one or more applications 42, which each communicate with operating system 46 through an application programming interface (API) 44. The communication between applications 42 and operating system 46 includes service requests by applications 42 for the presentation of audio and visual data. Operating system 46 services such presentation requests by forwarding the requests to appropriate device drivers, perhaps after some intermediate processing. As illustrated, the device drivers in communication with operating system 46 include audio device driver 48, which communicates output data to audio adapter 23, graphics device driver 50, which communicates output data to graphics adapter 21, and printer device driver 52, which communicates output data to printer 30. As described in detail below with respect to FIGS. 3–5, the audio and visual data output to the user via speaker 24, display 22, and printer 30 can be customized in accordance with the present invention to compensate for the physical limitations of a user of data processing system 10.

Figure 3:
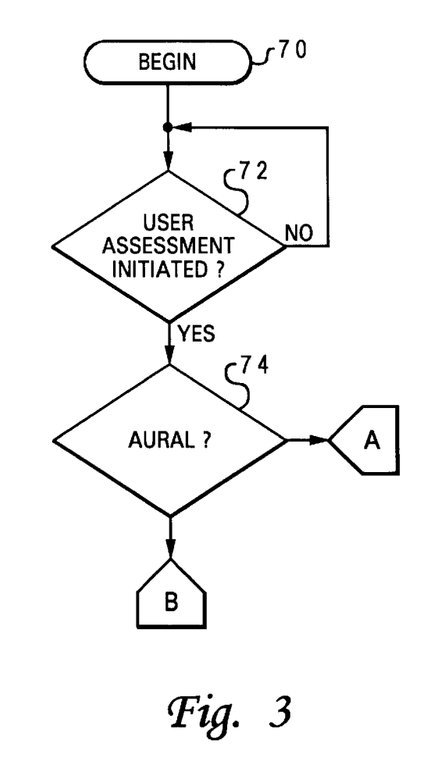
FIG. 3 is a high level logical flowchart of a process for assessing user impairment.
Figure 4:
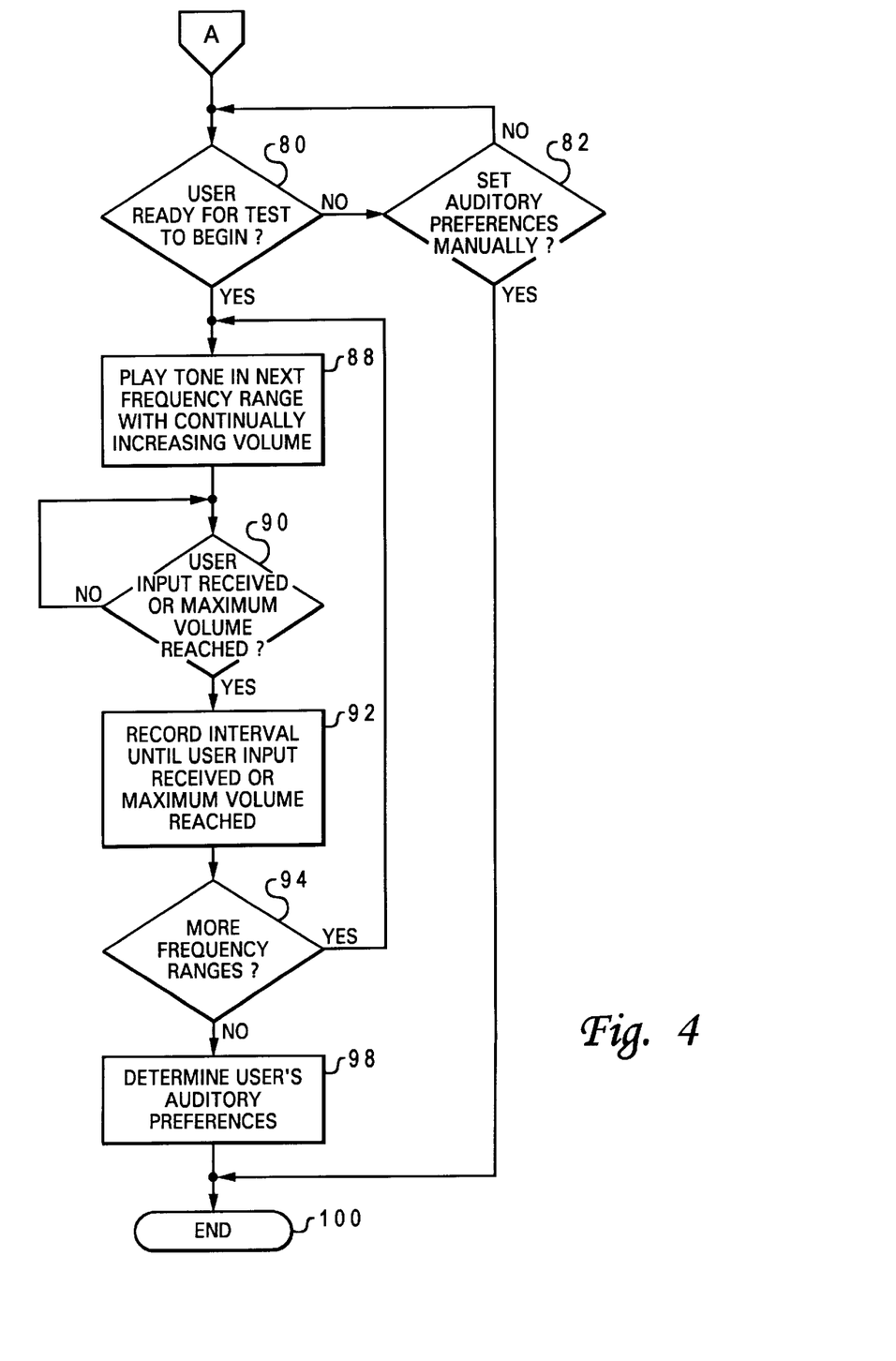
FIG. 4 is a high level logical flowchart of a process for assessing a user's aural impairment.
Figure 5:
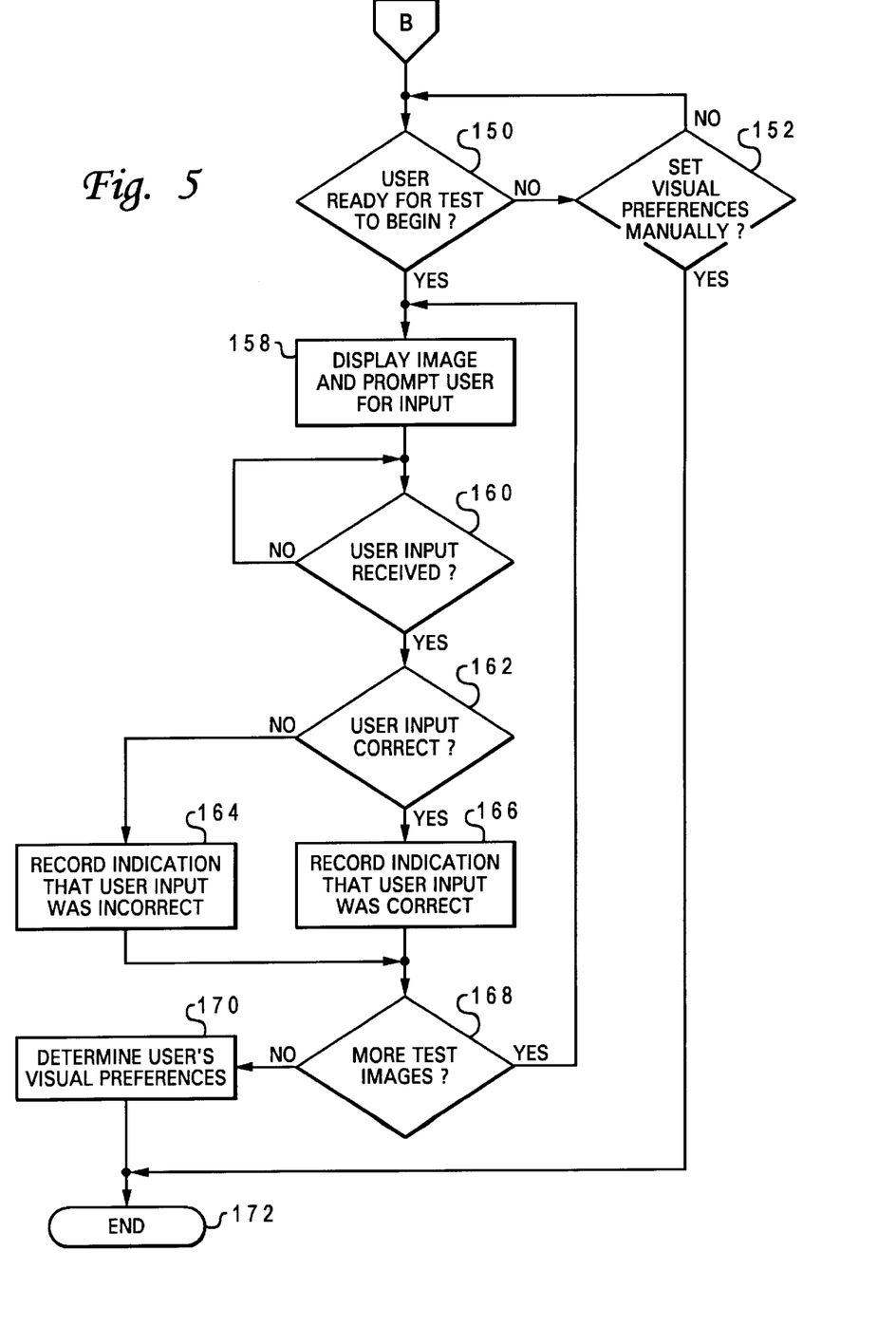
FIG. 5 is a high level logical flowchart of a process for assessing a user's visual impairment.

With reference now to FIGS. 3–5, there is illustrated a high level logical flowchart of an exemplary method for assessing the visual and aural acuity of a user of data processing system 10 in accordance with the present invention. It should be understood that the process illustrated in FIGS. 3–5 can be implemented by software at any layer of software configuration 40 illustrated in FIG. 2. For example, the process depicted in FIGS. 3–5 can be incorporated within one or more applications 42, within operating system 46, within one or more of device drivers 48, 50, and 52, or in multiple layers of software configuration 40. These and other implementations of the present invention will be readily apparent to a person of ordinary skill in the art from the flowcharts shown in FIGS. 3–5.

Referring first to FIG. 3, the process begins at block 70 and thereafter proceeds after to block 72, which illustrates a determination of whether or not user assessment has been initiated. User assessment can be initiated in any number of ways, for example, by selecting a configuration menu item from a menu bar provided by operating system 46, through the setup function of one of applications 42, or through a speech recognition interface. If a determination is made at block 72 that user assessment has not been initiated, the process simply iterates at block 72 until such time as user assessment is initiated. Then, in response to initiation of user assessment, the process passes to block 74, which illustrates a determination of whether the desired assessment is an assessment of the user's aural acuity. If so, the process proceeds through off-page connector A through on-page connector A of FIG. 4 to block 80.

Block 80 of FIG. 4 depicts a determination of whether or not the user is ready for the aural assessment to begin. The determination made at block 80 may entail, for example, displaying a graphical user interface (GUI) window within display 22 that prompts the user to select a "Ready" button utilizing a graphical pointer controlled by mouse 28. Selection of the "Ready" button may indicate, for example, that the user is wearing headphones (which correspond to speaker 24) and understands the instructions for the aural assessment. In response to a determination at block 80 that the user is not ready for the test to begin, the process passes to block 82, which illustrates a determination of whether or not the user desires to set auditory preferences manually. If so, the process passes to block 98, which is described below. If, however, a determination is made at block 82 that the user has not indicated a desire to set auditory preferences manually, the process simply returns to block 80.

In response to a determination at block 80 that the user is ready for aural assessment to begin, the process proceeds to block 88, which depicts data processing system 10 presenting an audio output at a frequency in a first frequency range, where the volume of the audio output is slowly but continually increased over time. For example, the tone presented during the first iteration of block 88 may be at a selected frequency (e.g., 50 hertz (Hz)) within the frequency range of 25 Hz–75 Hz. Next, at block 90 a determination is made whether the user has entered a selected input (e.g., a mouse click, a keystroke, speech command, etc.) indicating that the user has heard the tone presented at block 88 or whether the tone has been presented at a predetermined maximum volume. If the user has not entered the selected input and the tone has not been presented at the maximum volume, the process iterates at block 90 until the selected user input is received or the maximum volume is reached. In response to a determination at block 90 that the user has entered the selected input or that a maximum tone volume has been reached, the process passes to block 92.

Block 92 illustrates recording the interval between the time the presentation of the tone began and the user entered an input or the maximum volume was reached. Thus, the time interval that has elapsed between the beginning of the audio presentation and receipt of the user's input (or the time the maximum volume is reached) serves as an indication of the user's aural acuity in the current frequency range. As illustrated at block 94, a determination is then made whether or not the user's aural acuity has been tested in all audio frequency ranges. If not, the process returns to block 88, which illustrates data processing system 10 presenting a tone at a frequency within a next frequency range. For example, in one embodiment, a tone is then presented at approximately 100 Hz, representing the frequency range of 75–150 Hz. In subsequent iterations of block 88, tones can be presented at 200 Hz (representing a frequency range of 150–300 Hz), 400 Hz (representing a frequency range of 300–600 Hz), 800 Hz (representing a frequency range of 600–1200 Hz), 1.5 kHz (representing a frequency range of 1.20–2.25 kHz), 3 kHz (representing a frequency range of 2.25–4.50 kHz), 6 kHz (representing a frequency range of 4.5–9.0 kHz), and 12 kHz (representing a frequency range of 9–15 kHz).

In response to a determination at block 94 that the user's aural acuity has been tested in all of the predetermined frequency ranges, the process passes to block 98, which illustrates a determination of the user's auditory preferences. If the process passes to block 94 to block 98, thereby indicating that the user desires for software to automatically determine the user's auditory preferences, block 98 represents performing the process illustrated in FIG. 6. On the other hand, if the process illustrated in FIG. 4 passes from block 82 to block 98, block 98 depicts the user manually setting the user's auditory preferences via a GUI display that provides the user with sliders, radio knobs, numerical entry boxes, menus, or other well-known graphical elements. Thereafter, the process depicted in FIG. 4 terminates at block 100.

Figure 6:
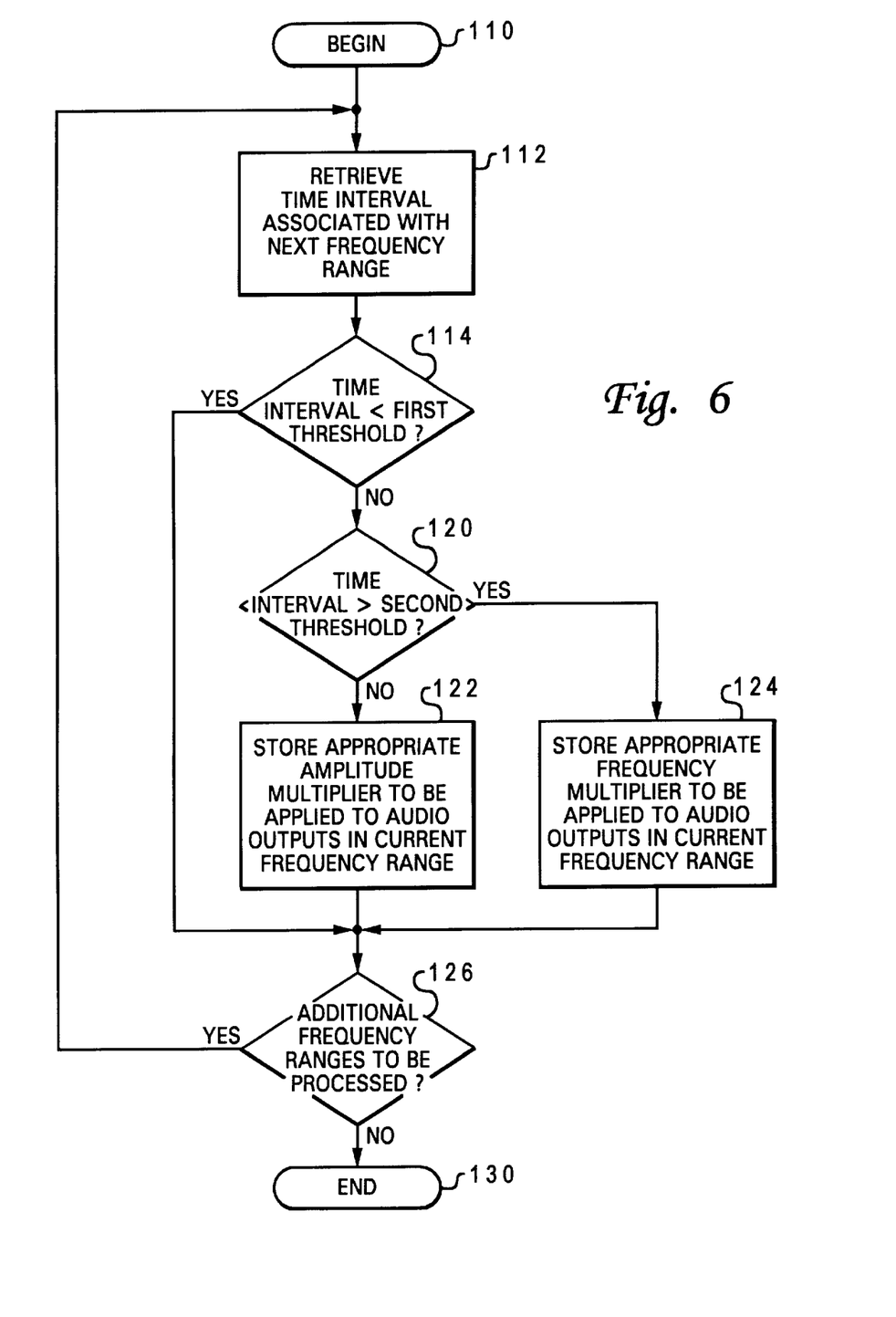
FIG. 6 is a high level logical flowchart of a process for automatically setting a user's auditory output preferences in response to assessment of the user's aural impairment.

With reference now to FIG. 6, there is depicted a process for automatically setting the user's auditory preferences in accordance with an exemplary embodiment of the present invention. As depicted, the process begins at block 110 and thereafter proceeds to block 112, which illustrates retrieving the time interval recorded for the next (or first) frequency range to be processed. A determination is then made at block 114 whether or not the time interval recorded for the current frequency range is less than a first threshold that represents nominal auditory impairment. If so, the process passes to block 126, which illustrates a determination of whether or not additional frequency ranges remain to be processed. If so, the process returns to block 112, which has been described. However, in response to a determination at block 126 that all frequency ranges have been processed, the process terminates at block 130.

Returning to block 114, in response to a determination that the time interval for the current frequency range is greater than the first threshold, the process passes to block 120, which illustrates a determination of whether or not the time interval for the current frequency range is greater than a second threshold representing moderate auditory impairment. If not, the process proceeds to block 122, which depicts storing, as part of the user's preferences, an appropriate amplitude multiplier to be applied to audio outputs within the current frequency range. The amplitude multiplier can be stored, for example, as part of the configuration of audio device driver 48. That way, during the presentation of audio data, audio device driver 48 can examine the digital frequency spectrum of the audio output and apply the amplitude multiplier to data within the frequency range in which the user has impairment prior to transmitting the audio data to audio adapter 23 for presentation. Following block 122, the process passes to block 126, which has been described.

Returning to block 120, in response to a determination that the time interval is greater than the second threshold indicative of moderate auditory impairment, the process passes to block 124. Block 124 illustrates storing, as a part of the user's auditory preference, a frequency multiplier to be applied to audio outputs within the current frequency range. The effect of the frequency multiplier is to shift all audio output spectral components within the frequency range of moderate impairment to a frequency range in which the user experiences no more than nominal auditory impairment. To minimize distortion in the audio output, the frequency multiplier preferably shifts the audio output to the closest adjacent frequency range in which the user has at most nominal impairment. As with the amplitude multiplier, the frequency multiplier is preferably stored as part of the configuration of audio device driver 48. In this manner, audio device driver 48 can apply the frequency multiplier to the appropriate spectral components of the audio output supplied to audio adapter 23. Following block 124, the process passes to block 126, which has been described.

In a preferred embodiment, the process illustrated in FIG. 6 has an associated data storage area that contains the first and second thresholds for each frequency range, as well as a first lookup table that stores available frequency multipliers for each frequency range and a second lookup table that stores normalized amplitude multipliers in association with differences between the user's time interval and the first threshold. The data contained in the data storage area can also be utilized to provide possible user selections and to set appropriate bounds on user selections in the GUI display utilized to manually set the user's auditory preferences, as discussed above with respect to block 98 of FIG. 4.

Referring again to block 74 of FIG. 3, in response to a determination that aural assessment has not been selected, the process proceeds through off-page connector B and on-page connector B of FIG. 5 to block 150 of FIG. 5, thereby indicating that visual assessment has been selected. Block 150 illustrates a determination of whether or not the user is ready for visual assessment to begin. As described above with respect to FIG. 4, the determination illustrated at block 150 can be, for example, by determining whether or not a user has selected a "Ready" button displayed on display 22 utilizing a graphical pointer controlled by mouse 28. In response to a determination at block 150 that the user is not ready for visual assessment to begin, the process passes to block 152, which depicts a determination of whether or not the user has expressed a desire to set visual preferences manually. If so, the process proceeds to block 170, which is described below. However, in response to a determination that the user has not indicated a desire to set visual preferences manually, the process returns to block 150.

In response to a determination at block 150 that the user has initiated assessment of visual acuity, an image is displayed with display 22 in conjunction with a prompt for the user to enter an input corresponding to the display image. The image displayed at block 158 may comprise, for example, a number of dots, where the coloration of the dots form a geometric shape, alphanumeric character, or the like. By utilizing dots of appropriate color, the user's color differentiation (i.e., color blindness) can be evaluated. Color combinations that user's are most frequently unable to discriminate between due to visual impairment include blue-green and red-orange, although other combinations can also be tested.

As shown at block 160, the image is displayed within display 22 until a user input is received. In response to receipt of a user input at block 160, a determination is made at block 162 whether or not the input is correct, that is, whether the user input corresponds to the display image. If not, a indication is stored at block 164 indicating the user's input for the image displayed at block 158 is incorrect; however, in response to a determination that the user's input is correct, an appropriate indication is stored at block 166. As illustrated at block 168, the process repeats blocks 158–166 until all diagnostic images have been displayed and all the user's inputs have been evaluated. It is important that the user's visual acuity is tested with an adequate number of images to obtain a statistically reliable assessment of the frequency ranges, if any, in which the user has visual impairment.

Next, at block 170 the user's visual preferences are determined. If the process proceeds from block 168 to block 170, the user's visual preferences are determined automatically by software. Alternatively, if the process illustrated in FIG. 5 proceeds from block 152 to block 170, the user's visual preferences are set manually, preferably utilizing conventional graphical user interface (GUI) techniques. Thereafter, the process depicted in FIG. 5 terminates at block 172.

Because the type of visual impairments detected by the process illustrated in FIG. 5 relate to an inability to discriminate between similar colors, the visual preferences determined at block 170 are preferably applied only if the colors that cannot be discriminated by the user are presented together (e.g., displayed in the same video frame or printed on the same page). The visual preferences can be applied in a number of ways, including by storing a color offset in association with one or both of the colors in a "problem" color combination. For example, if the user has difficulty discriminating between colors in the blue frequency range (4240–4910 Å) and green frequency range (4912–5560 Å), the user's visual preferences preferably include an offset that can be added to pixel color values of pixels in either or both of the blue and green frequency ranges in order to map at least pixels of one of the problem colors to a color outside the problem frequency range. Thus, if the user is blue-green color blind and blue and green are to be displayed together in the same frame, the pixels originally having pixel color values that specify blue colors can be mapped to pixel color values that specify colors in the violet frequency range (4000–4240 Å). Similarly, if the user is red-orange color blind and red and orange are to be printed on the same page, the pixels originally having pixel color values that specify colors in the orange frequency range (5850–6740 Å) can be mapped to pixel color values that specify colors in the yellow frequency range (5750–5850 Å). Of course, the mappings stored as part of the user's visual preferences can be automatically set to map colors to the closest colors for which the user does not suffer visual impairment or alternatively to a user specified colors.

As an alternative or supplement to "offset" color correction, other strategies may be utilized to compensate for a user's visual impairment. For example, pixels having color values corresponding to "problem" colors can be displayed at greater saturation or intensity. In addition, display parameters of a display device such as the contrast, resolution, and refresh rate can be enhanced. Furthermore, visual impairment caused by myopia (near-sightedness) or hyperopia (far-sightedness) can be measured much like aural impairment. For example, an alphanumeric character can be displayed at a slowly but steadily increasing font size, while the data processing system prompts the user to enter an input when the alphanumeric character is displayed at a recognizable size. Thereafter, the user's visual preferences can be set such that textual output is presented at font sizes at least as large as the font size displayed when the user input was received. A third strategy that may be utilized to compensate for a user's visual impairment is to alter the font utilized to display information—either by selecting a different font or by modifying the serifs and stems of characters in a selected font that may be difficult for a visually impaired user to differentiate.

Customization of audio output can also be extended to include phoneme enhancement. For example, a data processing system may present each phoneme of a particular language in turn as an audio output, while prompting the user to enter an input corresponding to the currently presented phoneme. In addition or as an alternative, the data processing system may audibly present similar sounding phonemes in groups and prompt the user to identify the presentation order of the phonemes. After testing the user's ability to discern between the phonemes of a language, the data processing system can enhance phonemes that the user has difficulty discerning. Such phoneme enhancement may include, for example, shifting the formant frequencies utilized to present "problem" phonemes and/or adjusting formant bandwidths. As will be appreciated by those skilled in the art, phoneme enhancement in accordance with the present invention would be particularly useful in customizing a user interface that employs synthesized speech.

As has been described, the present invention provides a method and system for customizing the output of a data processing system to compensate for the physical limitations of a user. In accordance with the present invention, the audio outputs of the data processing system can be amplified or mapped to a different frequency to compensate for a user's aural impairments. Similarly, visual outputs of the data processing system can be shifted to visual frequencies at which the user has greater acuity. In this manner, a user with nominal to moderate aural or visual impairment can customize the output of a data processing system to meet his or her individual needs.

While the invention has been particularly shown and described with reference to a preferred embodiment, it will be understood by those skilled in the art that various changes in form and detail may be made therein without departing from the spirit and scope of the invention. For example, although aspects of the present invention have been described with respect to a computer system executing software that directs the method of the present invention, it should be understood that present invention may alternatively be implemented as a computer program product for use with a computer system. Programs defining the functions of the present invention can be delivered to a computer system via a variety of signal-bearing media, which include, without limitation, non-writable storage media (e.g., CD-ROM), writable storage media (e.g., a floppy diskette or hard disk drive), and communication media, such as computer and telephone networks. It should be understood, therefore, that such signal-bearing media, when carrying or encoding computer readable instructions that direct the method functions of the present invention, represent alternative embodiments of the present invention. Moreover, although the present invention has been described with reference to an illustrative embodiment that comprises a personal computer system, those skilled in the art will appreciate that the present invention is also applicable to other types of data processing systems, including, without limitation, instrumentation equipment, personal digital assistants (PDAs), automatic teller machines (ATMs), webTV systems, appliances, and other consumer electronics.

What is claimed is:

1. A method for utilizing a data processing system to customize a user output of the data processing system, said method comprising the data processing system implemented steps of:

determining a user preference for an audio or visual user output of the data processing system;

in response to receiving a user output to be presented by the data processing system, automatically mapping a component of the user output characterized by a first audio or visual frequency range to a second audio or visual frequency range in accordance with said user preference to obtain a customized user output; and     presenting said customized user output utilizing the data processing system.

2. The method of claim 1, wherein determining a user preference comprises testing at least one of a user's visual and aural acuity.

3. The method of claim 2, wherein testing at least one of a user's visual and aural acuity comprises testing a user's aural acuity in a plurality of audio frequency ranges.

4. The method of claim 2, wherein testing at least one of a user's visual and aural acuity comprises testing a user's ability to differentiate colors.

5. The method of claim 3, wherein said first and said second frequency ranges comprise first and second audio frequency ranges, respectively, and wherein:

automatically mapping comprises automatically mapping said component of said user output to the second audio frequency range in response to said testing indicating that the user has moderate auditory impairment in said first audio frequency range; and     said method further comprises amplifying a second component of the user output characterized by a third audio frequency range to obtain a customized user output without said mapping in response to said testing indicating that the user has nominal audio impairment in the third audio frequency range.

6. The method of claim 1, wherein determining a user preference comprises permitting a user to specify one or more mappings between frequency ranges.

7. The method of claim 1, wherein presenting said customized user output comprises presenting said customized user output audibly if said user output comprises audio data and presenting said customized user output visually if said user out put comprises graphical data.

8. The method of claim 1, wherein:
said component of said user output is a first graphical component characterized by a first visual frequency range; and
said first graphical component is mapped to said second frequency range to obtain said customized user output only in response to a determination that a second graphical component of said user output that is to be presented in proximity to said first graphical component has a third visual frequency that is within a selected frequency interval of said first visual frequency range.

9. The method of claim 1, and further comprising generating said user output with a first program running in the data processing system, wherein mapping said user output comprises:
receiving said user output at a second program running in the data processing system; and
automatically mapping utilizing said second program to obtain said customized user output without modification of said first program.

10. The method of claim 9, wherein said second program comprises a device driver and automatically mapping comprises automatically mapping utilizing said device driver.

11. A data processing system having customizable user output, said data processing system comprising:
means for determining a user preference for an audio or visual user output;
means, responsive to receipt of a user output to be presented by the data processing system, for automatically mapping a component of the user output characterized by a first audio or visual frequency range to a second audio or visual frequency range in accordance with said user preference to obtain a customized user output; and
means for presenting said customized user output.

12. The data processing system of claim 11, wherein said means for determining a user preference comprises means for testing at least one of a user's visual and aural acuity.

13. The data processing system of claim 12, wherein said means for testing at least one of a user's visual and aural acuity comprises means for testing a user's aural acuity in a plurality of audio frequency ranges.

14. The data processing system of claim 12, wherein said means for testing at least one of a user's visual and aural acuity comprises means for testing a user's ability to differentiate colors.

15. The data processing system of claim 13, wherein:
said first and said second frequency ranges comprise first and second audio frequency ranges, respectively:
said means for mapping comprises means for mapping said component of said user output to the second audio frequency range in response to said testing indicating that the user has moderate auditory impairment in said first audio frequency range; and
said data processing system further comprises means for amplifying a second component of the user output characterized by a third audio frequency range to obtain a customized user output without said mapping in response to said testing indicating that the user has nominal audio impairment in the third audio frequency range.

16. The program product of claim 13, wherein:
said first and said second frequency ranges comprise first and second audio frequency ranges, respectively;
said instructions for causing the data processing system to map comprise instructions for causing the data processing system to map said component of the user output to the second audio frequency range in response to said testing indicating that the user has moderate auditory impairment in said first audio frequency range; and
said user output manager further comprises instructions for causing the data processing system to amplify a second component of the user output characterized by a third audio frequency range to obtain a customized user output without said mapping in response to said testing indicating that the user has nominal audio impairment in the third audio frequency range.

17. The data processing system of claim 11, wherein said means for determining a user preference comprises means for permitting a user to specify one or more mappings between frequency ranges.

18. The data processing system of claim 11, wherein said means for presenting said customized user output comprises means for presenting said customized user output audibly if said user output comp rises audio data and means for presenting said customized user output visually if said user output comprises graphical data.

19. The data processing system of claim 11, wherein:
said component of said user output is a first graphical component characterized by a first visual frequency range; and
said means for mapping comprises means for mapping said first graphical component to said second frequency range to obtain said customized user output only in response to a determination that a second graphical component of said user output that is to be presented in proximity to said first graphical component has a third visual frequency that is within a selected frequency interval of said first visual frequency range.

20. The data processing system of claim 11, and further comprising a first program running in the data processing system that generates said user output, wherein said means for mapping comprises:
a second program running in the data processing system that automatically maps said component of the user output to obtain said customized user output without modification of said first program.

21. The data processing system of claim 20, wherein said second program comprises a device driver.

22. A program product, comprising:
a user output manager encoded within a data processing system-usable medium, said user output manager including:
instructions for causing a data processing system to determine a user preference for an audio or visual user output; and
instructions, responsive to detecting a user output having component characterized by a first audio or visual frequency range, for causing the data processing system to automatically map the component of said user output to a second audio or visual frequency range in accordance with said user preference to obtain a customized user output for presentation by the data processing system.

23. The program product of claim 22, wherein said instructions for causing the data processing system to determine a user preference comprise instructions for causing the data processing system to test at least one of a user's visual and aural acuity.

24. The program product of claim 23, wherein said instructions for causing the data processing system to test at least one of a user's visual and aural acuity comprise instructions for causing the data processing system to test a user's aural acuity in a plurality of audio frequency ranges.

25. The program product of claim 23, wherein said instructions for causing the data processing system to test at least one of a user's visual and aural acuity comprise instructions for causing the data processing system to test a user's ability to differentiate colors.

26. The program product of claim 22, wherein said instructions for causing the data processing system to determine a user preference comprise instructions for causing the data processing system to permit a user to specify one or more mappings between frequency ranges.

27. The program product of claim 22, said user output manager further comprising instructions for causing the data processing system to present said customized user output.

28. The program product of claim 27, said instructions for causing the data processing system to present said customized user output comprising instructions for causing the data processing system to present said customized user output audibly if said user output comprises audio data and causing the data processing system to presenting said customized user output visually if said user output comprises graphical data.

29. The program product of claim 22, wherein:
    said component of said user output is a first graphical component characterized by a first visual frequency range; and
    said instructions for causing the data processing system to map comprise instructions for causing the data processing system to map said first graphical component to said second frequency range to obtain said customized user output only in response to a determination that a second graphical component of said user output that is to be presented in proximity to said first graphical component has a third visual frequency that is within a selected frequency interval of said first visual frequency range.

30. The program product of claim 22, wherein said user output manager comprises a device driver.

31. A method of presenting output of a data processing system to a user, comprising:
    utilizing the data processing system, determining auditory impairment of a user; and
    in response to said determination, automatically customizing an auditory output presentation of said data processing system to adjust at least one of formant bandwidth and formant frequency.

32. A method of presenting output of a data processing system to a user, comprising:
    utilizing the data processing system, determining a visual impairment of a user; and
    in response to said determination, automatically customizing a visual output presentation of the data processing system to increase at least one of an intensity and saturation of at least a portion of said visual output presentation.

* * * * *